INVENTOR.
EDWIN R. RICHARDS

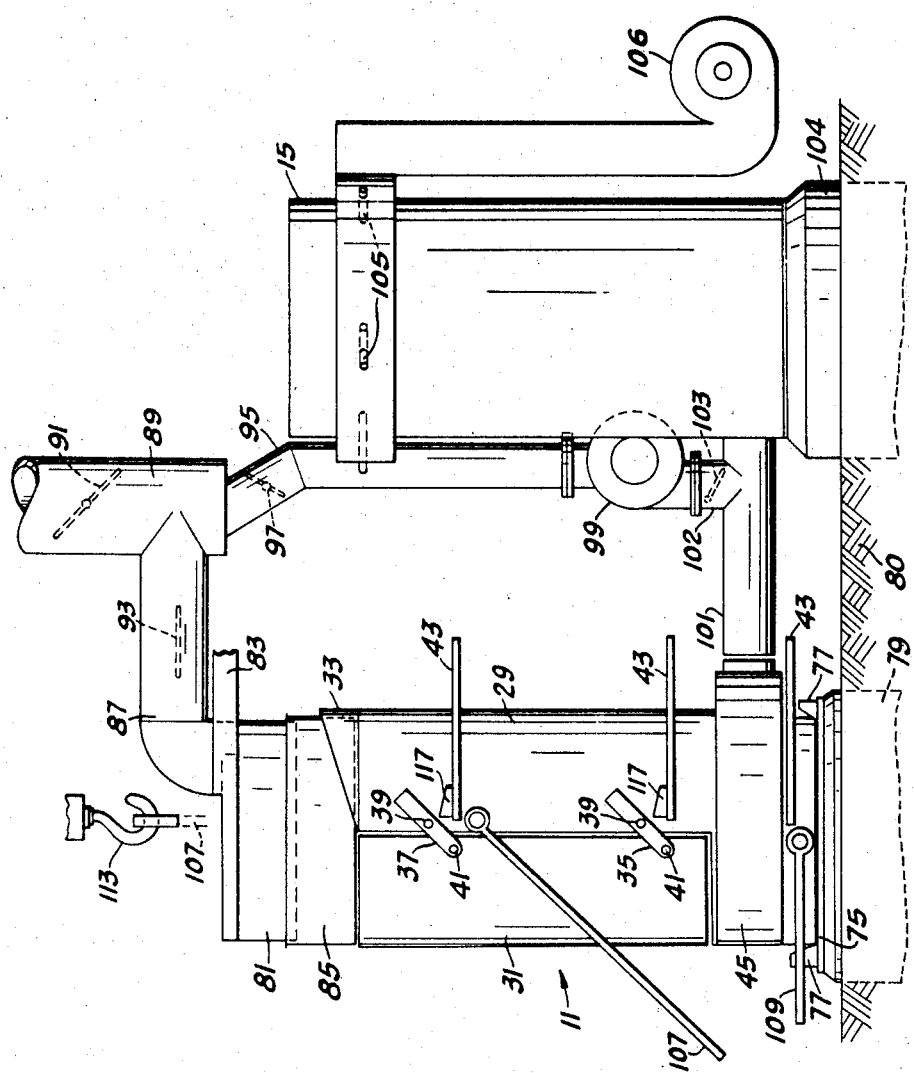

April 22, 1969      E. R. RICHARDS      3,439,909
APPARATUS FOR PREHEATING SCRAP METAL
Filed Sept. 17, 1965      Sheet 3 of 5

INVENTOR.
EDWIN R. RICHARDS
BY
his Attorney

INVENTOR.
EDWIN R. RICHARDS

United States Patent Office 3,439,909
Patented Apr. 22, 1969

3,439,909
APPARATUS FOR PREHEATING SCRAP METAL
Edwin Robinson Richards, Pittsburgh, Pa., assignor to Koppers Company, Inc., a corporation of Delaware
Filed Sept. 17, 1965, Ser. No. 488,155
Int. Cl. F27b 5/00, 7/00; C21b 7/08
U.S. Cl. 266—27                                14 Claims

ABSTRACT OF THE DISCLOSURE

Apparatus for preheating scrap metal includes the combination of a preheating furnace having two wall portions with one wall portion being capable of movement parallel to the other portion and a heating system that introduces hot gases into the preheating furnace.

---

This invention relates to steelmaking and, more particularly, to method and apparatus for preheating the scrap metal charge in the basic oxygen steel process.

Unlike the open hearth and electric furnace methods to produce steel, wherein the source of the process heat is derived entirely from sources, such as electric arcs and fuel burners, external to the charge itself, in a basic oxygen furnace process, the entire initial heat of the process is derived solely from the hot molten pig iron charged to the furnace. However, if the scrap metal charge portion is preheated before it is charged into the basic oxygen furnace, then, for a given size of converter a greater proportion of hot scrap metal can be used and a corresponding lesser proportion of molten pig iron is required for each heat of steel.

The present invention provides a process and apparatus for: charging cold scrap metal, which is removed from the usual storage area in the conventional manner, into a preheater; heating the scrap metal to a temperature of about 1500° F.; and, thereafter discharging the heated scrap metal into a basic oxygen furnace. Natural gas, which is burned in an adjacent combustion chamber, is a preferred heat source for the preheating of the scrap metal but, of course, oil or any other suitable fuel may be used if preferred.

As used herein "scrap metal" includes such items as scrap steel, scrap steel and alloys, alloys and ferroalloys, scrap steel and ferroalloys, scrap steel and additives such as lime and fluorspar, and scrap steel and fuels such as coke.

The present invention includes also the method steps: charging cold scrap metal into a preheater unit; weighing the scrap metal charged into the unit; removing the unit from the scrap charging area and placing it on its prepared foundation. Furthermore, the method includes connecting the unit to an exhaust hood and a combustion chamber in which fuel is burned to generate heat. The heat enters the unit and heats the scrap therein, exhausting from the unit via the hood. A portion of the gases is recirculated to the unit and a "soaking" period follows. Following the heating and "soaking" period the unit is disconnected from the hood and combustion chamber and the unit is removed to the region where the basic oxygen furnace is located. The method includes, moreover, the steps of tilting the furnace and discharging the heated scrap into the furnace and thereafter removing the unit to the charging area for reloading with cold scrap metal.

According to the present invention, a system for preheating scrap metal comprises a preheater furnace unit adapted to contain scrap metal which includes a bottom, a first wall portion fixedly connected to the bottom, a second wall portion pivotally connected to the fixed wall portion and adapted for movement relative to the fixed wall; both wall portions and the bottom forming an open ended receptacle for the scrap metal. Linkage bars connect the fixed wall portion to the movable wall portion and refractory material is mounted to the inner surfaces of both the movable and fixed wall and bottom.

In the fixed wall portion there are a plurality of tuyere openings adjacent the bottom of the furnace which communicate with the furnace interior. Outwardly, a bustle pipe surrounds at least a portion of the furnace fixed wall portion and is adapted to communicate heated gaseous products of combustion to the interior of the furnace via the tuyere openings. Suitable means is provided to handle the furnace in an overhead position to unload the heated scrap metal therefrom.

Along with each preheater there is a combustion chamber which is adapted to burn fuel and generate heated gaseous products of combustion which are conducted via suitable conduits to the bustle pipe. A first conduit connects the combustion chamber to the bustle pipe to convey the heated products to the furnace.

A hood is disposed over the furnace for receiving the heated gases after they have passed through the furnace and have heated the scrap metal therein, and an adjustable collar connects the hood to the furnace whereby the gaseous products of combustion are guided into the hood without loss to the atmosphere.

A stack is also provided for exhausting the gases from the hood, and suitable conduit means is provided connecting the hood to the stack. Another conduit connects the stack to the first conduit so that the gaseous products of combustion may be recirculated within the furnace whenever it is deemed desirable.

For a further understanding of the present invention and for advantages and features thereof, reference may be made to the following description taken in conjunction with the accompanying drawings which show, for the purpose of exemplification, a preferred embodiment of the invention.

In the drawings:

FIG. 2 is an elevational view of the arrangement of FIG. 1 taken along line II—II;

Figure 1:
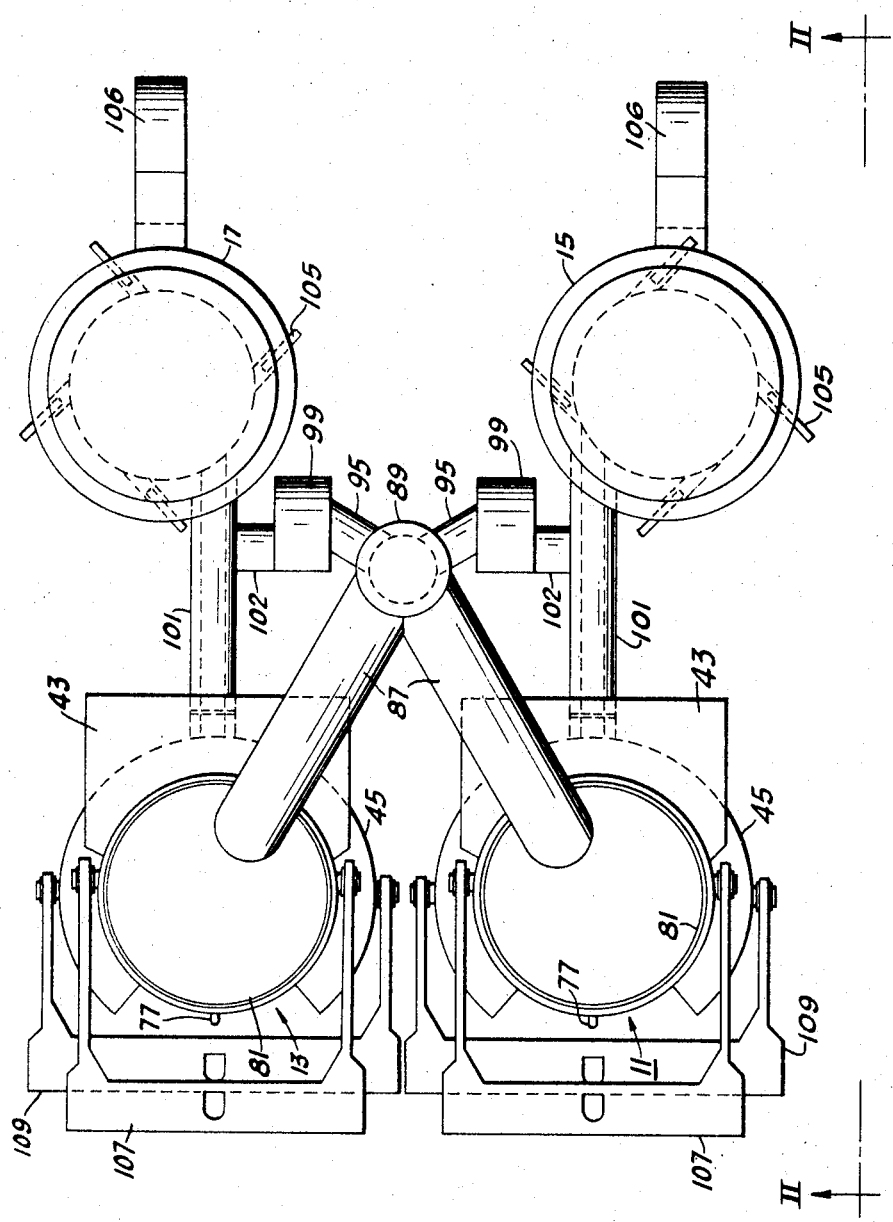
FIG. 1 is a plan view of an arrangement of scrap preheaters in accordance with the invention.

FIG. 1 illustrates a scrap preheater system which includes: a pair of scrap preheaters 11, 13 which are arranged in a convenient side-by-side relation; and a pair of combustion chambers 15, 17 for the respective scrap preheaters 11, 13.

The scrap preheater 13, for example, is identical to the scrap preheater 11, and so a description only of the preheater 11 suffices.

The preheater unit 11 includes a heavy bottom plate 19 which, for the purpose of the embodiment shown, is circular, and a vertical cylindrical wall 21 that is connected to the bottom plate 19 which is generally circular. The lower portion 23 of the vertical wall 21 is a unitary structure but above a level designated generally at 25, the cylindrical wall 21 is cut both vertically, as at 27, along a plane containing the central longitudinal axis of the cylindrical wall portion 21, and horizontally or radially, as at level 25, on one side of the aforementioned longitudinal plane. Thus, there is formed a fixed upper wall portion 29, which is integrally connected to the lower wall portion 23, and a movable upper wall portion 31 which is disposed in juxtaposed relation to the fixed upper and lower wall portions 29, 23. The upper end of the wall portion 29 terminates in a lip portion 33 which is shaped about as shown in FIG. 3 and which extends above the upper level of the fixed wall portion 29.

The movable upper wall portion 31 is connected to the fixed upper wall portion 29 by means of opposed pairs of spaced apart bars 35, 37, which are each pivotally fastened to both the fixed wall portion 29, as by pivot pin 39, and the movable upper wall portion 31, as by pivot pin 41. The bars 35, 37 extend beyond the pivot pins 39 a convenient length, as shown in FIG. 2, for a purpose to be described hereinafter.

Figure 4:
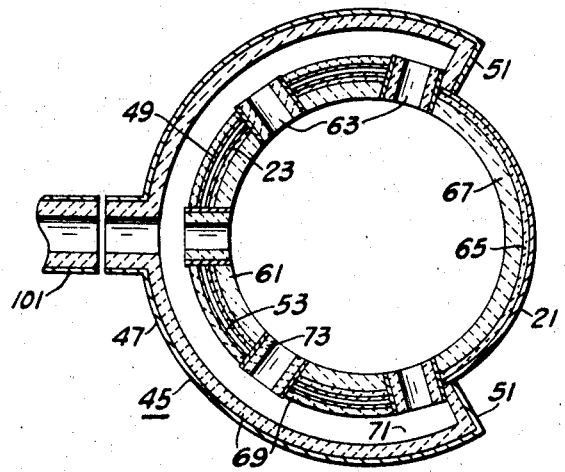
FIG. 4 is a sectional view taken along line IV—IV of FIG. 3.
Figure 3:
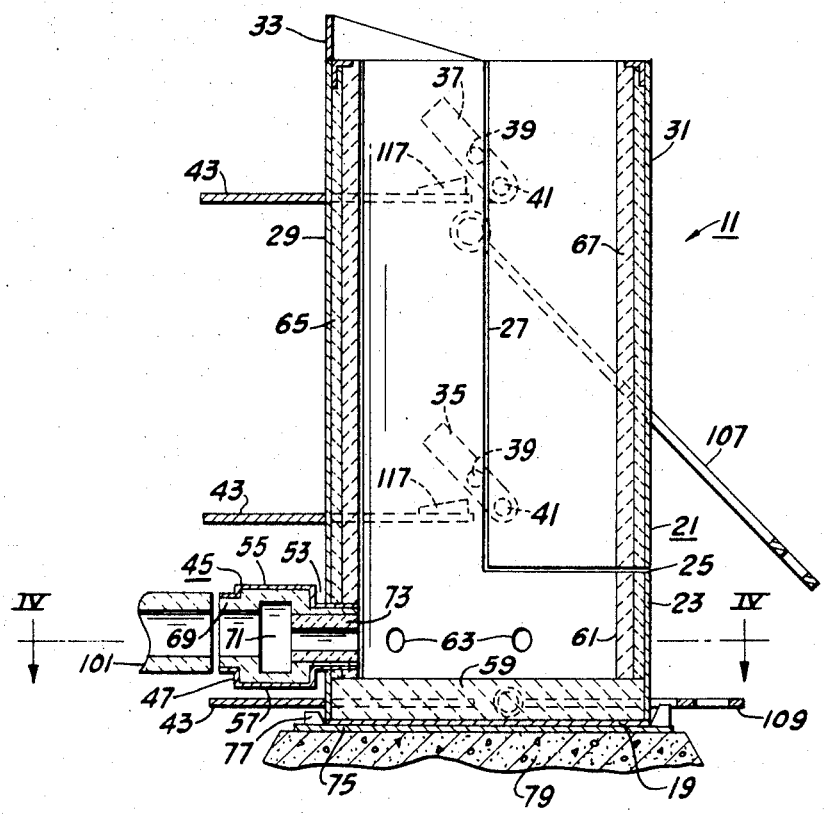
FIG. 3 is a longitudinal sectional view of one of the scrap preheaters.

Adjacent each pivot pin 41 and extending away therefrom, or toward the left as viewed in FIG. 3, there are a plurality of spaced apart support plates 43 (see FIG. 1) which are fixed to the fixed wall portion 29 as by welding, or in any other suitable manner. Preferably, the outer portions of such support plates have a generally rectangular contour (FIG. 1), and the heater 11 may be supported in a horizontal attitude by these support plates engaging any suitable structural support. It should be noted that the left edges of the support plates 43 (see FIG. 1) lie in a vertical plane that is generally parallel to the longitudinal axis of the furnace 11, and that the plane extends beyond the left extremity, as viewed in FIG. 3, of a bustle pipe 45 extending partially around the vertical lower wall portion, as shown in FIG. 4.

The bustle pipe 45 is comprised of a pair of spaced apart vertical arcuate plates 47, 49 that are connected at their extremities to vertical radial plates 51 which, in turn, are connected as by welding to the lower vertical wall 23. The vertical arcuate plate 49 is spaced from the wall member 23, forming an annular space 53 therebetween, and both the vertical plates 47, 49 are fixed to top and bottom horizontal plates 55, 57 respectively, as may be seen in FIG. 3. Thus, the bustle pipe 45 is spaced apart from the vertical wall 21 by an annular air space 53 and air circulating therein tends to prevent overheating of the plates of the bustle pipe and the vertical wall of the preheater.

Internally, the preheater 11 may be lined with any type of suitable refractory material. The bottom of the preheater is lined preferably with a relatively thick layer 59 of a monolithic rammed plastic refractory, of which there are several types that are commercially available. Suitable rammed refractories are those which are extremely hard and which are highly resistant to both shock and impact loads. Moreover, such refractories have a low coefficient of expansion, and are volumetrically stable.

Immediately above the bottom refractory layer 59, there is a tuyere block refractory layer 61 in which there are a plurality of tuyere openings 63. The tuyere blocks may be made of the same refractory material as the bottom refractory layer 59, and they are preferably set in place on the bottom layer before installing the upper wall refractory lining. The upper wall refractory lining, above the tuyere block layer 61, is comprised of a relatively thin lining 65 of an insulating refractory brick, which is placed adjacent the vertical cylindrical wall 21, and an innermost working wall of a refractory brick 67, which may be installed in the same manner as the lining in a steel ladle, or other like structures.

The bustle pipe 45 is also lined preferably with a suitable refractory 69 in such a manner that the usual internal annular passage 71 connects each of the tuyere openings 63. Each tuyere 63 has, of course, a suitable refractory lining 73 which may be readily installed and removed when replacement is necessary or desirable.

Turning to FIGS. 1 and 2, it will be noted that each preheater 11 is suitably supported on a heavy base or support plate 75 which is provided with a plurality of upstanding angularly spaced apart lugs 77 which serve to guide and position the bottom plate 19 of the preheater 11 relative to a central position on the base plate 75. The base plate 75 is, as shown in FIG. 2, mounted to a suitable concrete support structure or foundation 79, which may be suitably imbedded in the ground 80, or otherwise suitably fixed.

For each preheater 11, there is provided a hood 81, which is preferably fixed to a suitable support structure 83 disposed at a convenient level above the lip 33 of the preheater. Around the periphery of the hood 81, there is an adjustable slip collar 85 which is adapted to be readily and quickly opened and closed so as to allow the preheater 11 to be readily removed from the base plate when it is desired. The collar 85 also forms an air seal between the hood 81 and the preheater 11 to prevent the entrance of air thereinto and to prevent the exhaust gases from escaping to atmosphere.

The hood 81 is connected to a conduit 87 and to an exhaust stack 89. In the conduit 87 there is a conventional control damper 91 which is used to regulate and control the flow of exhaust gases from the preheater 11. Preferably, there is maintained in the stack 89, by conventional blower equipment, a slight positive air pressure, which means that there is a tendency for the exhaust gases to escape from the hood and collar. Also, this means that air will not tend to infiltrate the stack, or the hood, or the collar and cool the exhaust gases. An additional control damper 93 is located in the conduit 87 about where shown in FIG. 2.

In the lower region of the stack 89, preferably just below the control damper 91, another conduit 95 is connected to the stack 89 and to the inlet side of a high temperature blower 99. The outlet side of the blower 99 is connected to a duct 101 from the combustion chamber 15 through an intermediary short conduit or duct 102. In the conduit 95 there is an internally mounted damper 97 which functions as a control device to regulate the amount of exhaust gases which are drawn into and mixed with the hot gases in the combustion chamber exhaust line 101 by the blower 99.

There is also provided in the duct 102, leading from the outlet side of the blower 99 to the duct 101, a one-way flow regulating device 103, preferably of the check valve type, which prevents the higher temperature gases in the combustion chamber exhaust duct 101 from entering and damaging the blower 99. Such a one-way flow regulating device 103 is available commercially and is shown only schematically in FIG. 2.

The combustion chamber 15 is of the conventional vertical cylindrical type and is conveniently mounted on a foundation 104 which is suitably embedded in the ground 80, and which is disposed near the preheater unit 11. The combustion chamber is adapted to burn a hydrocarbon type of fuel in a plurality of tangential burners 105, in such a manner that the gaseous products of combustion when leaving the combustion chamber 15 are at a temperature of about 2500° F. A suitable blower 106 to provide combustion air to the chamber 15 is provided as shown in FIG. 2.

The heated products of combustion are conveyed from the combustion chamber 15 by means of the conduit 101 to the bustle pipe 45, and any suitable type of connector, while not shown, may be used to join the conduit 101 to the bustle pipe 45. Preferably, the connector will be of the type that can be operated with a minimum of time to make a rapid connection and disconnection.

Figure 5:
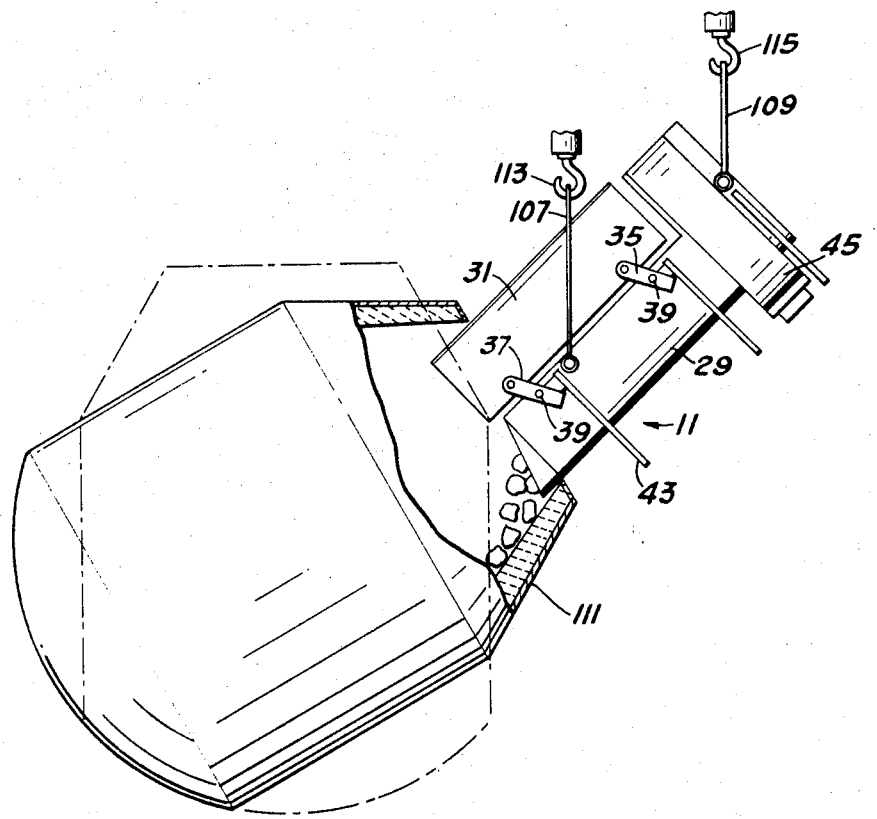
FIG. 5 is a view showing the preheater in the process of discharging preheated scrap metal into a basic oxygen converter.

For purposes of handling the scrap preheater unit 11, there is pivotally mounted to each unit a pair of spaced apart bails; an upper bail 107 and a lower bail 109, each of which may have a form about as shown in FIG. 1. The general manner of discharging a quantity of preheated scrap metal into a basic oxygen converter 111 is shown in FIG. 5.

Initially, assuming a previous charge of preheated scrap metal has been discharged into the basic oxygen converter 111, both of the preheaters 11, 13 are empty and are supported in a vertical position on a conventional transfer car (not shown). The transfer car is preferably positioned on a scale, located conveniently to the loading area, so that the amount of scrap being loaded into the preheater can be weighed.

Figure 6:
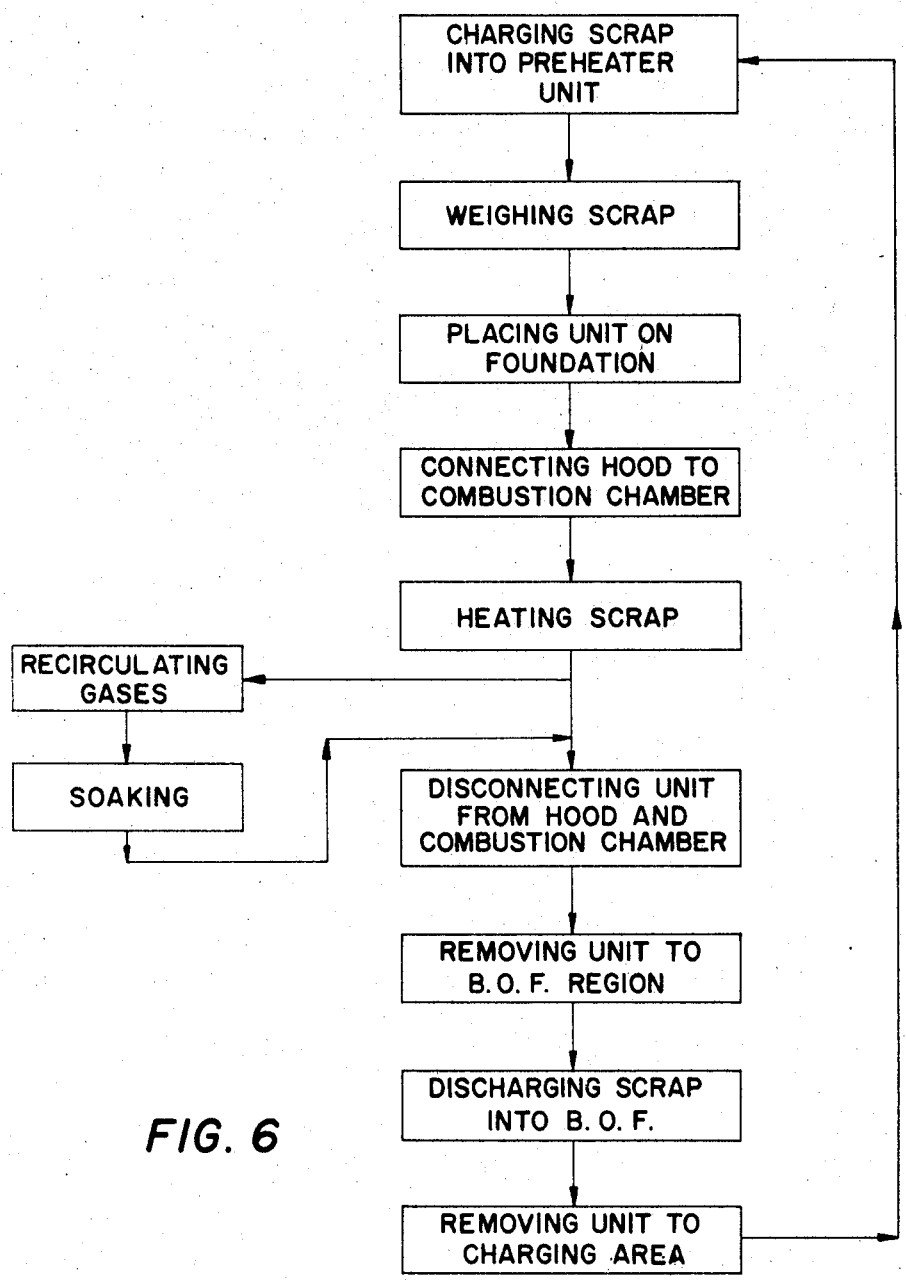
FIG. 6 is a schematic diagram of the method steps of the present invention.

Referring to FIG. 6, a load of scrap metal is charged into the empty preheater units. This loading of scrap metal into the preheater unit can best be done using a conventional electromagnet, though other suitable loading apparatus may be used. The inside diameter of the refractory lining 67 in the preheater 11, should preferably be somewhat larger than the diameter of an electromagnet. In a typical installation, the inside diameter of the preheater lining could be about 96 inches, and the diameter of electromagnet might be 60 or 72 inches. Thus, there is sufficient clearance between the magnet and the load it carries, and the lining, to allow the initial load of scrap to be lowered to near the bottom of the preheater. Such a loading arrangement, therefore precludes dropping the scrap metal a large distance and the consequent damage to the bottom of the furnace by the impact of the heavy scrap pieces.

Generally, the heavier pieces of scrap metal, such as revert scrap, are loaded first. In a typical application, revert or plant generated heavy scrap may consist of rejected ingots, or the butt ends of ingots, and these may be typically as much as 30-inches thick. Therefore, these should be loaded first in a position near the tuyeres which is at the bottom of the preheater. Lighter pieces of scrap metal, of course, should be intermixed with the heavy scrap metal in order to separate the heavier pieces and to provide interstices for the heating gases to circulate around the heavy scrap pieces. Thereafter, the medium scrap is loaded, and then the lighter scrap metal is loaded, in this order preferably, since this will minimize "packing" of the scrap.

After the preheater has been properly positioned on its foundation and the slip collar 85 placed in position between the hood 81 and the top of the preheater unit 11, the preheater is ready to receive hot gases of combustion from the combustion chamber 15 by way of conduit 101.

Two preheaters are generally fired at the same time to prepare scrap metal for a basic oxygen furnace heat, although the utilization of four preheaters is preferable as this admits of two units to be heating while the other two units are being discharged into the basic oxygen furnace. Typically, a 150 ton basic oxygen furnace may be charged with preheated scrap metal in about 20 minutes. The preheating time, using two preheaters, will be about 70 minutes and each preheater will contain about 32 tons of scrap metal that is heated to a temperature of about 1550° F.

After the preheaters are charged, and the scrap is weighed, the transfer car is moved to the preheater area, and the preheaters are transferred to their respective locations on foundations 79. Each preheater may be transferred from the transfer car to its base plate and foundation by using a crane having a crane hook 113 which engages the upper bail 107. The preheater unit is readily and properly located on the base plate 75 by means of the several positioning lugs 77 that guide the preheater to its proper location on the base plate in alignment with respect to the heating conduit 101.

Each preheater is then connected by its respective heating conduit 101 to its respective combustion chamber 15. Thereafter, the gas-tight connection mentioned previously, may be made between the heating conduit 101 and the bustle pipe 45.

At the beginning of the preheating period, only a small portion of the hot gases from the combustion chamber 15, passing through the hood 81, are recirculated to the bustle pipe 45 via the blower 99. This is desirable initially for the reason that the higher temperature gases from the combustion chamber 15 are not thereby cooled by mixing with the recirculated gases and the hot gases can quickly raise the temperature of the heavier scrap metal. During the latter part of the heating cycle though, the several dampers 91, 93, 97 may be adjusted to allow a larger portion of the gases in conduit 87 to recirculate by way of conduits 95 and 102 through the preheater 11, and the firing rate of the combustion chamber 15 accordingly can be reduced. The latter part of the heating cycle when the gases are recirculating in the manner mentioned herein corresponds to a short "soaking" period during which the larger pieces of scrap become more uniformly heated.

Those skilled in the art will recognize that it is important to regulate and control the amount of heat in the preheater so that there are a minimum of local areas of high heat, since light scrap when heated excessively tends to "ball up" in a sticky mass. This condition imposes some restriction on the loading arrangement and the heating rate to the extent that overheating of the light scrap does not occur.

After the slip collar and heating conduit have been disconnected from the preheater unit, it may be lifted from its foundation by means of the crane hook 113 engaging the upper bail. Another crane hook 115 engages the lower bail and raises the lower end until the preheater is in a desired attitude. The preheater unit is moved to the general area of the basic oxygen furnace, which, in the meantime, has been rotated to the position shown in FIG. 5. Then the crane hook 115 raises the bustle pipe end of the preheater until the preheater assumes the attitude shown in FIG. 5.

It will be noted now, that the movable upper wall portion 31 has pivoted about the pivot pins 39 and is spaced apart and from the fixed upper wall portion 29. The arms 35, 37 pivot until they engage wedge type stops 117 which are fixed to the sides of the upper wall portion and which limit the amount of pivoting of the arms, as well as the amount of movement of the movable wall portion. A feature of the invention is that preparatory to unloading the preheater, the movable upper wall portion raises slightly and allows the preheated scrap to more easily slide out of the preheater. This feature avoids the tendency of "bulged" preheated scrap to clog and jam the lip opening in the preheater. In some applications, the walls of the preheater may even have a slight taper to facilitate the scrap sliding easily from the preheater.

After charging the preheated scrap into the basic oxygen furnace, the preheater is returned to a generally horizontal attitude by lowering the crane hook 115, and the movable wall section pivots back to its initial juxtaposed position. The cranes then place the preheater back on the transfer car.

Preparatory to the next loading operation, while the preheater is in a horizontal attitude, the movable wall portion is raised slightly in any suitable manner and the "joint" surface between the movable and fixed wall portions is prepared with a sealant, using any suitable temporary sealing material. Thereafter, the movable section is lowered into juxtaposition with the fixed wall portion, and the preheater is ready to receive another charge of scrap metal.

While in some applications, a single combustion chamber might be adequate to serve two preheaters simultaneously, yet a higher degree of flexibility is obtained when each preheater is served by its own combustion chamber. Likewise, the use of two preheaters per heat of metal in a basic oxygen furnace is desirable, but is not necessarily required; one preheater may suffice. Use of two preheaters per heat of steel admits of greater flexibility in operation such as, for example, charging one preheater with heavy and medium scrap, and the other preheater with light scrap. Then, the heavy-medium scrap preheater can be fired at a higher rate than the light scrap preheater, since the degree of preheat of the heavy-medium scrap is generally much higher than the degree of preheat of the light scrap, which would "ball up" at the higher rate of firing.

While FIG. 1 illustrates an embodiment of the invention wherein two preheaters are operating simultaneously, those skilled in the art will recognize that other preheaters may be arranged along with the two that are shown. In fact, two, three, four, or more preheaters may be operated simultaneously in any particular installation.

The foregoing has described a novel process and apparatus wherein a load of scrap metal is charged into a single container and weighed, preheated, transported and discharged into a basic oxygen furnace. The novel container, which permits such a multiplicity of operations to be carried out, also includes features which enable the heated scrap metal to readily leave the container even though the scrap may have expanded and "bulged" during the heating operation. The foregoing system enables the basic oxygen furnace operation to be carried out in a more economical fashion and with less investment than has been necessary heretofore.

Although the invention has been described herein with a certain degree of particularity, it is understood that the present disclosure has been made only as an example and that various modifications and changes may be made within the scope of the invention as defined by the appended claims.

What is claimed is:
1. Apparatus for preheating scrap metal comprising:
   (a) a bottom portion;
   (b) a first wall portion fixed to said bottom portion;
   (c) a second wall portion parallelly movable with respect to said first wall portion and disposed in juxtaposed relation thereto forming an open-ended receptacle for holding scrap metal;
   (d) linkage means pivotally connecting said fixed wall and said second movable wall portions so that said second wall portion moves parallel to said first wall portion;
   (e) refractory material disposed on said bottom and on both said fixed and movable wall portions, said fixed wall portion and refractory having therein a plurality of tuyere openings;
   (f) a bustle pipe surrounding at least a part of said fixed wall portion for conducting heated gaseous products of combustion; and
   (g) conduit means connecting said bustle pipe and said tuyere whereby said heated gaseous products of combustion are transferable from said bustle pipe to the interior of said apparatus for preheating scrap metal therein.

2. The invention set forth in claim 1 including:
   (a) means for handling said preheated and positioning the same to discharge scrap metal therefrom as said movable wall portion pivots away from said juxtaposed relation with said fixed wall portion.

3. A scrap metal preheater comprising:
   (a) an open-ended receptacle having a fixed wall portion and a parallelly movable wall portion;
   (b) a closure at one end of said receptacle connected to said fixed wall portion;
   (c) linkage means pivotally connecting said movable and said fixed wall portions so that said movable wall portion moves parallel to said fixed wall portion;
   (d) means to pass heated gaseous substance into and through said receptacle whereby scrap metal therein is heated; and
   (e) means for handling said receptacle to unload said preheated scrap, said movable wall portion pivoting parallelly away from said fixed wall portion as said scrap discharges from said receptacle.

4. The invention set forth in claim 3 including:
   (a) means for generating said heated gaseous substance; and
   (b) means for conducting said heated gaseous substance into said receptacle.

5. The invention set forth in claim 4 including:
   (a) a bustle pipe surrounding at least a part of said receptacle for receiving said heated gaseous substance;
   (b) tuyere openings in the fixed wall portion of said receptacle; and
   (c) conduit means connecting said bustle pipe and said tuyere openings whereby said heated gaseous substance is conveyed into said receptacle.

6. A scrap metal preheater unit comprising:
   (a) a receptacle for holding said scrap metal including a first wall portion fixed to an end closure member;
   (b) a movable second wall portion disposed in juxtaposed relation and capable of parallel movement with respect to said first fixed wall portion, one end of said receptacle being open;
   (c) linkage means pivotally connecting said first and second wall portions whereby said movable second wall portion is parallelly movable with respect to said first fixed wall portion; and
   (d) means for conveying heat into the interior of said preheater for heating scrap metal therein.

7. The invention set forth in claim 6 including:
   (a) refractory material secured to the inner surfaces of said receptacle; and
   (b) tuyere openings in said fixed wall portion for admitting heat into the interior of said receptacle.

8. A system for preheating scrap metal comprising:
   (a) a preheater unit including
      (i) a bottom portion;
      (ii) a first wall portion fixed to said bottom portion having therein tuyere openings;
      (iii) a second wall portion parallelly movable with respect to said first wall portion and disposed in juxtaposed relation thereto forming an open-ended receptacle for scrap metal;
      (iv) linkage means pivotally connecting said first fixed wall to said second movable wall portions so that said second wall portion is movable parallel to said first wall portion;
      (v) a bustle pipe surrounding at least a part of said fixed wall portion for conducting heated gaseous substance; and
      (vi) first conduit means connecting said bustle pipe and said tuyeres whereby said heated gaseous substance is conveyed from said bustle pipe to the interior of said preheater unit for heating scrap metal therein;
   (b) a combustion chamber for generating heated gaseous substance;
   (c) a hood disposed over said preheater unit for receiving said heated gaseous substance after the same has passed through said preheater unit and heated said scrap metal;
   (d) second conduit means connecting said combustion chamber and said bustle pipe; and
   (e) means connecting said hood and said preheater unit whereby said heated gaseous substance is conveyed from said preheater unit to said hood.

9. The invention set forth in claim 8 including:
   (a) a stack for receiving and conveying elsewhere said heated gaseous substance; and
   (b) third conduit means connecting said hood to said stack.

10. The invention set forth in claim 9 including:
    (a) fourth conduit means connecting said third conduit means and said second conduit means; and
    (b) damper means in both said third and fourth conduit means for regulating and controlling the flow of said heated gaseous substance in said third and fourth conduit means.

11. A system for preheating scrap metal comprising:
    (a) a plurality of scrap preheater units each including:
       (i) a bottom portion;
       (ii) a first wall portion fixed to said bottom portion having therein tuyere openings;
       (iii) a second wall portion capable of parallel movement with respect to said first wall portion and disposed in juxtaposed relation thereto forming an open-ended receptacle for scrap metal;

(iv) linkage means pivotally connecting said fixed wall to said movable wall portions so that said movable wall portion moves parallel with respect to said fixed wall portion;
(v) a bustle pipe surrounding at least a part of said fixed wall portion for conducting heated gaseous substance; and
(vi) first conduit means connecting said bustle pipe and said tuyeres whereby said heated gaseous substance is conveyed from said bustle pipe to the interior of said preheater unit for heating scrap metal therein;

(b) a plurality of combustion chambers for generating heated gaseous substance;
(c) conduit means connecting a respective bustle pipe and a combustion chamber;
(d) hood means disposed over each preheater unit for receiving the heated gaseous substance after the same has passed through said preheater unit and heated the scrap metal therein;
(e) conduit means connecting a respective hood and a preheater unit;
(f) a stack for receiving and conveying elsewhere said heated gaseous substance;
(g) conduit means connecting said stack to at least one of said hoods;
(h) conduit means connecting said last named conduit means and the conduit means connecting each said bustle pipe and preheater unit; and
(i) damper means in said conduit means connecting said stack and hoods whereby said heated gaseous substance may be recirculated selectively through said preheater units.

12. In a system for charging scrap metal into a basic oxygen furnace wherein the scrap is loaded, weighed, heated, transported and discharged from a single container, the novel container comprising:
(a) a first wall portion fixed to at least one end closure;
(b) a second wall portion that is capable of parallel movement relative to said first wall portion;
(c) linkage means pivotally connecting said second wall portion to said first wall;
(d) means for supplying heated gaseous substances to said container whereby said gaseous substance flows through said container and heats said scrap therein;
(e) means for transporting said container to the vicinity of said basic oxygen furnace; and
(f) means for orienting said container and discharging said heated scrap metal into said furnace.

13. In a system for charging scrap metal into a basic oxygen furnace wherein the scrap is loaded, weighed, heated, transported and discharged from a single container, the novel container comprising:
(a) a generally cylindrical first wall portion fixed to an end closure;
(b) a second generally cylindrical wall portion in juxtaposed relation to said first wall portion forming a closed ended container;
(c) linkage means pivotally connecting said second wall portion to said first wall portion for moving said second wall portion parallel to said first wall portion;
(d) refractory material supported by the inner surfaces of said end closure and said walls;
(e) means for flowing heated gaseous substance through said container whereby said scrap metal is preheated; and
(f) means for supporting said container above said basic oxygen furnace in an attitude to discharge said scrap metal from said container.

14. In a system for preparing a charge of scrap metal for use in a basic oxygen furnace the combination comprising:
(a) a container closed at one end and having a first wall portion that is capable of parallel movement relative to another second fixed wall portion;
(b) linkage means pivotally connecting said second wall portion to said first wall for moving said second wall portion parallel to said first wall portion;
(c) means for generating heated gaseous substance;
(d) means for flowing said heated gaseous substance through said container and heating said scrap metal; and
(e) means for positioning said container relative to said furnace whereby said movable wall portion moves parallelly with respect to said fixed wall portion and said preheated scrap metal discharges from said container into said furnace.

References Cited

UNITED STATES PATENTS

| | | | |
|---|---|---|---|
| 899,374 | 9/1908 | Bechman | 249—154 |
| 2,140,181 | 12/1938 | Bangle | 266—29 |
| 2,683,032 | 7/1954 | Hartman | 266—25 X |
| 3,186,830 | 6/1965 | Moore et al. | 266—29 X |
| 3,253,823 | 5/1966 | Junker et al. | 266—25 X |
| 3,304,171 | 2/1967 | McClesky | 266—25 X |
| 3,314,550 | 4/1967 | McCready et al. | |

J. SPENCER OVERHOLSER, *Primary Examiner.*

EUGENE MAR, *Assistant Examiner.*

U.S. Cl. X.R.

266—30, 31